US008406696B2

(12) United States Patent
Trainin et al.

(10) Patent No.: US 8,406,696 B2
(45) Date of Patent: Mar. 26, 2013

(54) LINK RE-ESTABLISHMENT IN A WIRELESS NETWORK

(75) Inventors: Solomon Trainin, Haifa (IL); Carlos Cordeiro, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 634 days.

(21) Appl. No.: 12/380,958

(22) Filed: Mar. 5, 2009

(65) Prior Publication Data

US 2009/0233636 A1 Sep. 17, 2009

Related U.S. Application Data

(60) Provisional application No. 61/035,480, filed on Mar. 11, 2008.

(51) Int. Cl.
*H04B 1/00* (2006.01)
*H04B 15/00* (2006.01)

(52) U.S. Cl. ..................... 455/63.4; 455/67.11; 455/515

(58) Field of Classification Search .................. 455/63.4
See application file for complete search history.

(56) References Cited

U.S. PATENT DOCUMENTS

2005/0249173 A1* 11/2005 Salokannel et al. .......... 370/338
2007/0287384 A1* 12/2007 Sadri et al. .................. 455/63.4

OTHER PUBLICATIONS

U.S. Appl. No. 12/286,354, filed Sep. 30, 2008.

* cited by examiner

*Primary Examiner* — John Poos
(74) *Attorney, Agent, or Firm* — Sutherland Asbill & Brennan LLP

(57) ABSTRACT

In a wireless network using directional communication links between devices in the network, when the network controller detects that one or more of the directional links is lost, it may use a beacon to schedule separate antenna training periods for the devices involved in the lost links. In some embodiments, all of the training periods may take place in the same super-frame as the beacon.

29 Claims, 4 Drawing Sheets

LINK RE-ESTABLISHMENT IN A WIRELESS NETWORK

CROSS REFERENCE TO RELATED APPLICATIONS

This application claims the benefit under 35 U.S.C. 119(e) to U.S. provisional patent application No. 61/035,480, filed Mar. 11, 2008, which is hereby incorporated by reference.

BACKGROUND

In a wireless personal area network known as a piconet, with the piconet network controller (PNC) scheduling overall communications within the network, the PNC and each associated device (DEV) may use multi-antenna directional communications between itself and the PNC to reduce the potential interference between the various devices in the network. The antenna parameters for such directional communication may be established during a beam-forming antenna training session between the two devices, with the time for this training session allocated by the PNC. But once established, if this directional link is lost the two devices must perform beam training again to reestablish the directional link. Under conventional procedures, the DEV will determine the link is lost when it doesn't receive a beacon, the DEV will use the Contention Access Period (CAP) to request re-establishment of the link, and the PNC will subsequently allocate a time slot for this new beam training in a subsequent superframe. But if multiple devices lose their links at the same time (e.g., if the PNC is physically moved or rotated), there may be too many devices contending for access to the PNC during the CAP, resulting in collisions and failure to achieve the desired communication. Since not all the DEV's are likely to get through to the PNC in the same superframe, the re-establishment of the links may likely be spread across several superframes, with a separate omnidirectional transmission to each device, possibly preventing communications for other devices throughout the network during those periods.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

Figure 1:
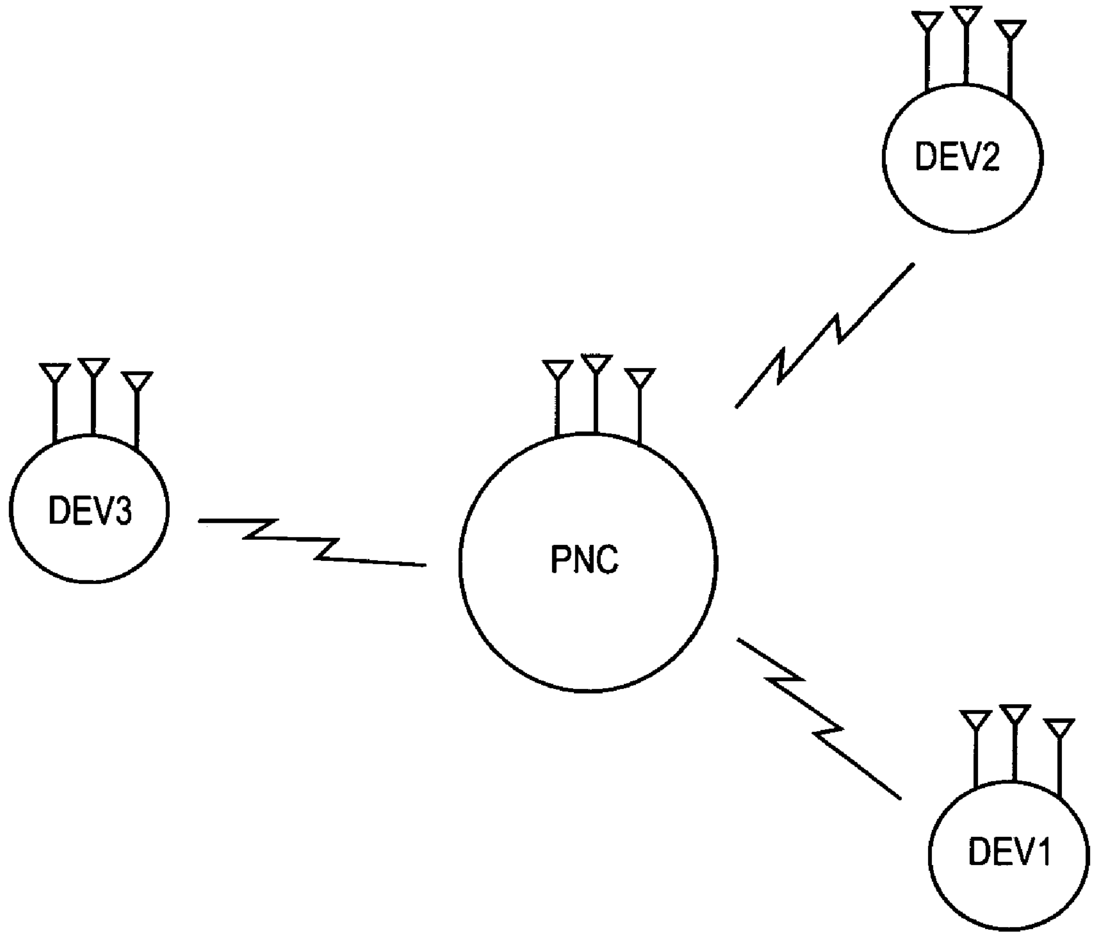
FIG. 1 shows a wireless communications network, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a computer-readable medium, which may be read and executed by one or more processors to enable performance of the operations described herein. A computer-readable medium may include any mechanism for storing, transmitting, and/or receiving information in a form readable by one or more computers. For example, a computer-readable medium may include a tangible storage medium, such as but not limited to read only memory (ROM); random access memory (RAM); magnetic disk storage media; optical storage media; a flash memory device, etc. A computer-readable medium may also include a propagated signal which has been modulated to encode the instructions, such as but not limited to electromagnetic, optical, or acoustical carrier wave signals.

The term "wireless" and its derivatives may be used to describe circuits, devices, systems, methods, techniques, communications channels, etc., that communicate data by using modulated electromagnetic radiation through a non-solid medium. The term does not imply that the associated devices do not contain any wires, although in some embodiments they might not.

For convenience of reference within this document, each network may be referred to as a piconet (which typically may operate at or near the 60 GHz band), each network controller may be referred to as a piconet controller (PNC), and each of the other network devices may be referred to as a DEV, as this terminology is already common in piconet technology. However, these terms are intended to be used as examples only. The use of these terms in this document should not be construed as limiting the embodiments of the invention to piconets, or to devices that are labeled as PNC or DEV, unless those limitations are specifically claimed.

In some embodiments, the PNC may determine that a directional link has been lost when it does not receive, within a predefined time, a response from a DEV after requesting a response from that DEV. The PNC may then use an omni-directional beacon to assign a time-slot to the DEV for antenna training, and perform the antenna training process with the DEV during that time slot. If multiple DEV's require antenna training, the PNC may use the same beacon to assign separate time slots to each of those DEV's during the same superframe. This process does not require the use of the Contention Access Period, with its associated uncertainties, and in fact does not require a DEV to even be aware that its directional link has been lost.

FIG. 1 shows a wireless communications network, according to an embodiment of the invention. In the illustrated embodiment, the network controller is shown as PNC, while the associated network devices that communicate with it are shown as DEV1, DEV2, and DEV3. When no directional link exists between the PNC and a particular DEV, the PNC and that DEV may communicate using omnidirectional transmissions. However, after the PNC and that DEV perform antenna training, they may be able to communicate with each other using a directional link. 'Directional communication' indicates that the transmissions and receptions between these two devices are directional. A directional transmission means the transmission is relatively strong in one direction and relatively weak in the other directions, within the intended frequency band. A directional reception means the receiving device can receive signals from one direction more easily than it can receive equivalent strength signals from other directions, within the intended frequency band. Once a directional link has been established between two devices, all communication between them may be directional, but they may also have the option to transmit and/or receive omnidirectionally for particular communications (for example, the PNC may wish to broadcast the same information to all DEV's omnidirectionally, even though the directional links are still operable). Although the embodiments described herein tend to focus on communications between a PNC and a DEV, the same principles may be applied to communications between two DEV's in the network.

Each of the devices in FIG. 1 are shown with multiple antennas to achieve directional communication. In this example each device has three antennas, but other embodiments may have any feasible number of antennas greater than one. Each device may or may not have the same number of antennas as the other devices. Each device may also have a processor to process information, and a radio to transmit and receive modulated signals wirelessly. Directional transmissions and/or receptions may be established in various ways. For example, on devices with phased array antenna technology, in which each of multiple antennas is essentially omnidirectional, different parameters may be applied to the signal for each antenna, so that the resultant combination of signals produces a transmitted signal that is strong in one direction but weak in the other directions (for directional transmission) or that receives signals strongly from one direction but weakly from the other directions (for directional reception). Alternately, on devices that use sectored antennas, each antenna may be physically configured to transmit/receive directionally, and the device can select the antenna that is focused in a particular direction. Other antenna techniques may also be used to achieve directionality. In some embodiments, establishing the correct direction for transmission and/or reception may require 'antenna training', in which various parameters and/or antennas are tried until the best signal is obtained.

Figure 2:
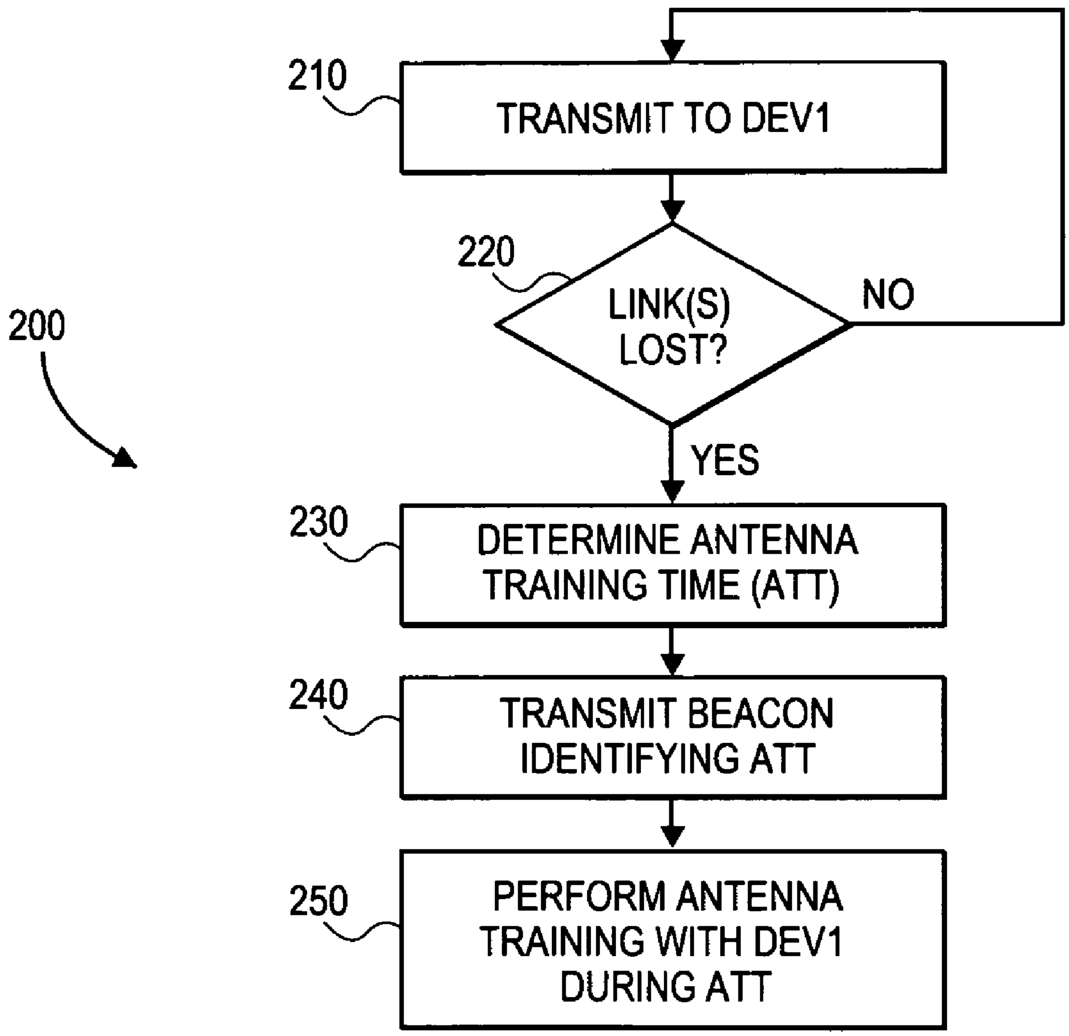
FIG. 2 shows a flow diagram of a method of re-establishing a directional link, according to an embodiment of the invention.

FIG. 2 shows a flow diagram of a method of re-establishing a directional link, according to an embodiment of the invention. In the illustrated embodiment, this method may be performed by a PNC with an associated device DEV1 (referring to the devices in FIG. 1). At 210, the PNC may make a directional transmission to DEV1, the transmission being in a form that expects a response of some kind from DEV1, which may also be transmitted directionally. The response may take any feasible form. For example, an acknowledgement (ACK) may be expected back from DEV1 to indicate that the transmission was successfully received by DEV1. Such an ACK may be in any feasible format, such as but not limited to one or more bits transmitted during a Short InterFrame Space (SIFS) However, other responses may also be used for this purpose, such as but not limited to specific data being returned in response to a request for such data.

If a response is received from DEV1, that may indicate that the directional link between PNC and DEV1 is still operational, and subsequent communications with DEV1 may be continued, using the directional link. This loop at 210-220 may continue as long as the directional link is performing adequately. However, if the directional link is determined to be lost, as indicated at 220, the PNC may proceed to operation 230. Various techniques may be used to determine that the directional link with DEV1 has been lost. Such techniques may include, but are not limited to: 1) a single response from DEV1 is not received, 2) a predetermined number of multiple consecutive responses, to multiple transmissions, are not received from DEV1, 3) quality parameters for the link fall below a predetermined level, 4) etc. In some embodiments, the problem condition(s) that are used to determine a lost link may have to persist for a minimum period of time before the link is considered lost.

Various conditions may cause the directional link to be lost. These conditions may include, but are not limited to: 1) device PNC and/or device DEV1 may be physically rotated, so that the directionality of the associated transmission and/or reception is no longed aligned with the other device, 2) one or both of the devices may be physically moved laterally, so that the directionality of communications between the two devices needs to be changed, 3) an obstruction may move between the two devices, blocking off some or all of the signal, 4) etc. (Although antenna training probably won't help condition 3, the PNC is unlikely to know that at the time the link is lost, and may proceed as indicated.)

At 230, the PNC may determine a time to perform antenna training with DEV1. At 240, the PNC may indicate this training time by including that information in a beacon, with the information addressed to DEV1 in some manner. Since the PNC does not know in which direction DEV1 is currently located, the PNC may transmit this beacon omni-directionally. At the scheduled time, the PNC and DEV1 may perform antenna training at 250.

Although not indicated directly in FIG. 2, multiple links (to multiple DEV's) may be lost at approximately the same time. This would likely be the case if the PNC was physically rotated. In such a case, the operations 230-250 may be performed approximately in parallel for the different devices that lost their link, with a different training time determined for each device at 230, the beacon at 240 containing different training time information for each of the multiple devices, and the antenna training at 250 being performed at a different time for each of the multiple devices. In some embodiments, the beacon and the indicated training time(s) occur in the same superframe, although other embodiments may have some or all of the training times in a separate superframe than the beacon.

Figure 3:
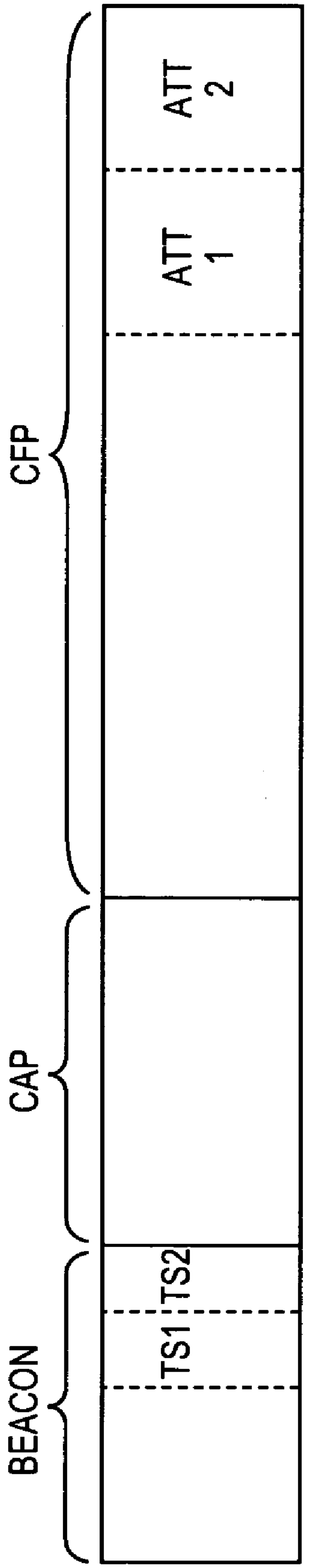
FIG. 3 shows an overall format for a superframe, according to an embodiment of the invention.

FIG. 3 shows an overall format for a superframe, according to an embodiment of the invention. The first part of the superframe may contain the beacon. Beacons may be used for various purposes, and may contain information suitable for those purposes. For example, a beacon may contain timing information to enable the devices associated with the PNC to synchronize their clocks with that of the PNC. The beacon may contain an invitation to join the network, for devices not currently associated with the PNC. The beacon may also contain the aforementioned antenna training information. For example, the antenna training time for DEV1 may be contained in TS1, while the antenna training time for DEV2 may be contained in TS2.

The superframe may also contain a Contention Access Period (CAP). This allows devices to attempt to establish communications with the PNC by accessing the medium through a contention-based protocol. In a CAP technique, the various devices that want to communicate with the PNC may each try to obtain access to the medium during the CAP, although none of them have been previously scheduled to communicate during the CAP. Once it accesses the medium, a device may transmit to the PNC. In one common technique, each device will listen to the medium to determine if it is already being used. If it is, the device will wait until it detects no carrier on the medium. Once no carrier is detected, the device may assume the medium is currently idle, and may start transmitting. If two or more devices perform this action at the same time, and end up transmitting at the same time, a collision will be detected, and both devices may stop transmitting and wait for a period of time before retrying. To reduce the chance of a second collision occurring for the same reasons, each device may choose its own delay time to wait before a retry. Various techniques are known to choose these delay times.

The next indicated time period in FIG. 3 is the Contention-Free Period (CFP). The various devices in the network may communicate with each other at scheduled times during the CFP. One or more of these scheduled communications may be the antenna training denoted in the beacon at times ATT1 and ATT2. The PNC may establish separate ATT's in the same superframe for as many multiple devices as is desirable and/or feasible. Although the ATT's are shown at the end of the CFP, in other embodiments they may be scheduled for other portions of the CFP.

Figure 4:
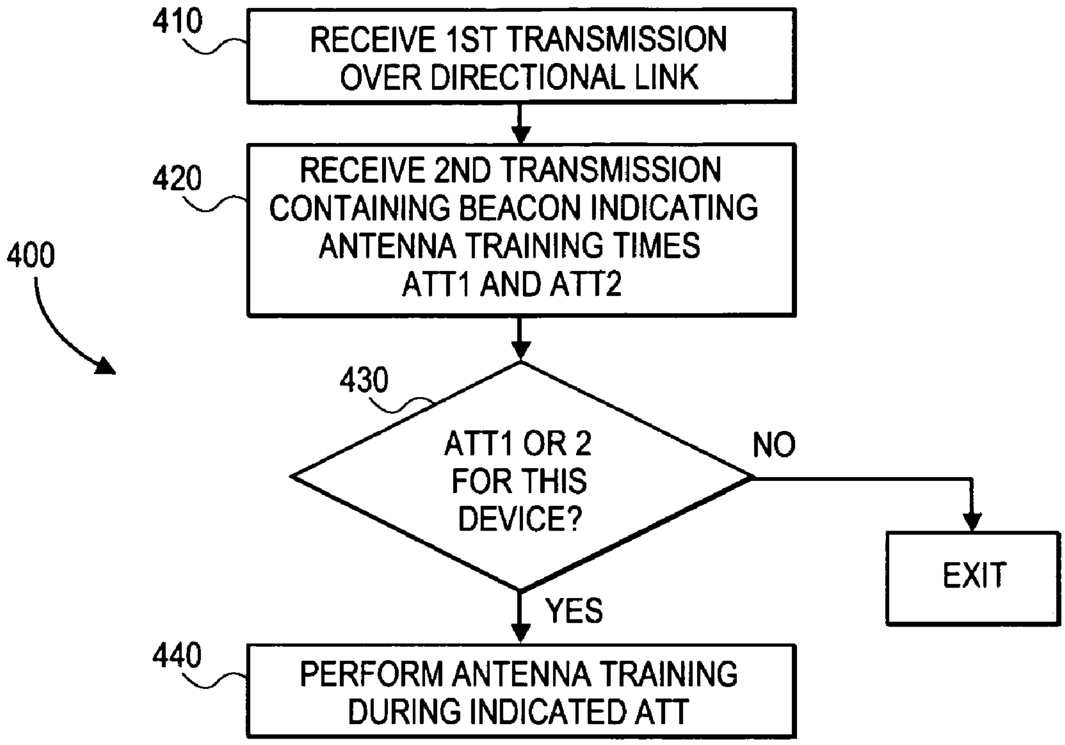
FIG. 4 shows a flow diagram of a method of re-establishing a directional link, according to another embodiment of the invention.

FIG. 4 shows a flow diagram of a method of re-establishing a directional link, according to another embodiment of the invention. This method may involve a process similar to that of FIG. 2, but from the DEV's perspective rather than the PNC's perspective. In flow diagram 400, at 410 the DEV may receive a directional communication in a superframe from the PNC. At 420 the DEV may receive another superframe, but the beacon in this superframe may specify antenna training times (ATT1 and ATT2) for at least two devices in the network. If the DEV determines at 430 that one of the training times is intended for the DEV, then the DEV may perform such antenna training during the indicated ATT at 440. If none of the indicated training times are specified for the DEV, then the DEV may continue with further directional communications as usual.

In a conventional network, each DEV may determine if its directional link has been lost, and then use the CAP to request a training time in a future superframe from the PNC. This can be a time-consuming process, especially if multiple devices lose their directional link at the same time. In the system described in this disclosure, the PNC may determine that the link has been lost, and schedule a training time even though the DEV has not requested such training (and may not even be aware that the link has been lost), without requiring any device to use the uncertain CAP to trigger such training.

The foregoing description is intended to be illustrative and not limiting. Variations will occur to those of skill in the art. Those variations are intended to be included in the various embodiments of the invention, which are limited only by the scope of the following claims.

What is claimed is:

1. An apparatus, comprising a first wireless communications device containing a processor and a radio, the first wireless communications device to:

detect loss of a first directional communications link between the first wireless communications device and a second wireless communications device; and transmit, omnidirectionally, a superframe containing a beacon and a time period for scheduled communications prior to receiving a request for the time period from the second wireless communication device;

wherein the beacon indicates a first portion of the time period for antenna training between the first and second wireless communications devices.

2. The apparatus of claim 1, wherein the first wireless communications device is to perform the antenna training with the second communications device during the first portion.

3. The apparatus of claim 1, wherein:

the first wireless communications device is to detect loss of a second directional communications link between the first wireless communications device and a third wireless communications device; and the beacon is to indicate a second portion of the time period for antenna training between the first and third wireless communications devices.

4. The apparatus of claim 1, wherein the first wireless communications device is to be a piconet controller.

5. The apparatus of claim 1, wherein the first wireless communications device is to detect the loss of the first directional communications link by detecting absence of an expected response from the second wireless communications device.

6. The apparatus of claim 1, wherein the beacon is to be transmitted omnidirectionally.

7. The apparatus of claim 1, further comprising multiple antennas for the directional communications.

8. A method, comprising:

detecting, by a first wireless communications device, loss of a first directional communications link between the first wireless communications device and a second wireless communications device; and transmitting, by the first wireless communications device, a superframe containing a beacon and a time period for scheduled communications prior to receiving a request for the time period from the second wireless communication device;

wherein the beacon indicates a first portion of the time period for antenna training between the first and second wireless communications devices.

9. The method of claim 8, further comprising performing the antenna training with the second communications device during the first portion.

10. The method of claim 8, further comprising:

detecting, by the first wireless communications device, loss of a second directional communications link between the first wireless communications device and a third wireless communications device; and indicating, within the beacon, a second portion of the time period for antenna training between the first and third wireless communications devices.

11. The method of claim 8, wherein said detecting the loss of the first directional communications link comprises detecting absence of an expected response from the second wireless communications device.

12. The method of claim 8, wherein said transmitting comprises transmitting the beacon omnidirectionally.

13. An article of manufacture comprising a non-transitory computer readable medium that contains computer executable instructions, which when executed by one or more processors result in performing operations comprising:

detecting loss of a first directional communications link with a first wireless communications device; and transmitting a superframe containing a beacon and a time period for scheduled communications prior to receiving a request for the time period from the second wireless communication device;

wherein the beacon indicates a first portion of the time period, for antenna training with the first wireless communications device.

14. The article of claim 13, wherein the operations further comprise performing the antenna training with the first communications device during the first portion.

15. The article of claim 13, wherein the operations further comprise:

detecting loss of a second directional communications link with a second wireless communications device; and indicating, within the beacon, a second portion of the time period for antenna training with the second wireless communications device.

16. The article of claim 13, wherein the operation of detecting the loss of the first directional communications link comprises detecting absence of an expected response from the second wireless communications device.

17. The article of claim 13, wherein the operation of transmitting comprises transmitting the beacon omnidirectionally.

18. An apparatus, comprising a first wireless communications device containing a processor and a radio, the first wireless communications device to:

receive a superframe from a network controller in a wireless communications network, wherein the superframe comprises a beacon and a time period for scheduled communication prior to receiving a request for the time period from the second wireless communications device;

wherein the beacon indicates a first portion of the time period for antenna training between the network controller and the first wireless communications device.

19. The apparatus of claim 18, wherein the first wireless communications device is to perform the antenna training with network controller during the first portion.

20. The apparatus of claim 18, wherein:

the beacon is to identify a second portion of the time period for antenna training between the network controller and a second wireless communications device.

21. The apparatus of claim 18, wherein the network controller is a piconet controller.

22. The apparatus of claim 18, wherein the first wireless communications device comprises multiple antennas for directional communication.

23. A method, comprising:

receiving, by a first wireless communications device in a first superframe from a wireless network controller, a directional communication;

receiving, in a second superframe from the wireless network controller, an omnidirectional beacon and a time period for scheduled communications prior to receiving a request for the time period from the second wireless communication device;

wherein the beacon indicates a first portion of the time period for antenna training between the first wireless communications device and the network controller.

24. The method of claim 23, further comprising performing the antenna training with the network controller during the first portion.

25. The method of claim 23, further comprising:

receiving an indication within the beacon of a second portion of the time period for antenna training between the network controller and a second wireless communications device.

26. An article of manufacture comprising a non-transitory computer readable medium that contains computer executable instructions, which when executed by one or more processors result in performing operations comprising:

receiving, by a first wireless communications device, a superframe containing a beacon and a time period for scheduled communications prior to receiving a request for the time period from the second wireless communication device;

wherein the beacon identifies a first portion of the time period for antenna training with a network controller.

27. The article of claim 26, wherein the operations further comprise performing the antenna training with the network controller during the first portion.

28. The article of claim 26, wherein the operations further comprise:

identifying, within the beacon, a second portion of the time period for antenna training between the network controller and a second wireless communications device.

29. The article of claim 26, wherein the operation of receiving comprises receiving the beacon omnidirectionally.

* * * * *